United States Patent [19]

Hanrahan

[11] Patent Number: 5,767,060
[45] Date of Patent: Jun. 16, 1998

[54] BONDED POLYMER FILTER MEDIUM AND ITS USE

[75] Inventor: Michael Hanrahan, Woodinville, Wash.

[73] Assignee: Advanced Water Systems, Woodinville, Wash.

[21] Appl. No.: 741,268

[22] Filed: Oct. 30, 1996

[51] Int. Cl.$^6$ ............................................. B01D 39/04
[52] U.S. Cl. ........................ 210/502.1; 210/504; 210/506
[58] Field of Search ................................ 210/694, 263, 210/282, 502.1, 503, 504, 505, 506, 508, 908; 502/402, 417

[56] References Cited

U.S. PATENT DOCUMENTS

| | | | |
|---|---|---|---|
| 3,375,933 | 4/1968 | Rodman | 210/504 |
| 3,474,600 | 10/1969 | Tobias | 210/506 |
| 3,538,020 | 11/1970 | Heskett | 210/506 |
| 3,568,846 | 3/1971 | Haefner | 210/506 |
| 3,905,910 | 9/1975 | Coombs | 210/506 |
| 4,076,892 | 2/1978 | Fennimore | 210/506 |
| 4,190,542 | 2/1980 | Hodgson | 210/506 |
| 4,664,683 | 5/1987 | Degen | 210/502.1 |
| 4,753,728 | 6/1988 | Vander Bilt | 210/506 |
| 4,789,475 | 12/1988 | Harte | 210/502.1 |
| 5,348,755 | 9/1994 | Roy | 210/504 |
| 5,374,357 | 12/1994 | Comstock | 210/504 |

OTHER PUBLICATIONS

Material Safety Data Sheet, Jun. 25, 1993, Advanced Water Systems, Inc. for product PetroLOK-FM Filter Media. pp. 1-4.

Environmental Data Sheet, Jun. 25, 1993, Advanced Water Systems, Inc. for product PetroLOK-FM Filter Media. p. 1.

*Primary Examiner*—Ernest G. Therkorn
*Attorney, Agent, or Firm*—Thomas M. Freiburger

[57] ABSTRACT

A bonded multi-component filter medium preferably contains at least two active components, namely, activated carbon adsorbent and a blend of at least two organic polymer absorbents. The medium is prepared by adding a selected quantity of carbon of a preselected size to a mixer, then wetting the activated carbon with a water-based aliphatic resin binder adhesive, preferably also with a surfactant, thus eliminating the static charge on the carbon, then adding hydrophobic absorption bonding polymers to the mixer, then thoroughly mixing the hydrophobic absorption bonding polymer with the carbon in preselected proportions, until both the carbon particles and the polymer particles are effectively coated with the binder adhesive. After thoroughly mixing, the medium mixture is preferably poured into filter cartridge forms, and then air-dried at room temperature and low humidity, to cure the aliphatic resin adhesive binder. Upon curing, the medium mixture forms a loose but cohesive and relatively low density sponge-like mass. As a result, an exemplary bonded multi-component medium is provided, with properties superior to either polymers or activated carbon alone. More importantly, this unique bonded multi-component medium allows use of both polymers and activated carbon in a common filter vessel, thus simplifying design, operation, and maintenance of filtration equipment.

8 Claims, 4 Drawing Sheets

POLYBUTADIENE — MIDBLOCK S-B-S POLYMER

POLY(ETHYLENE-BUTYLENE — MIDBLOCK S-EB-S POLYMER

POLYSTYRENE — ENDBLOCK BOTH POLYMERS

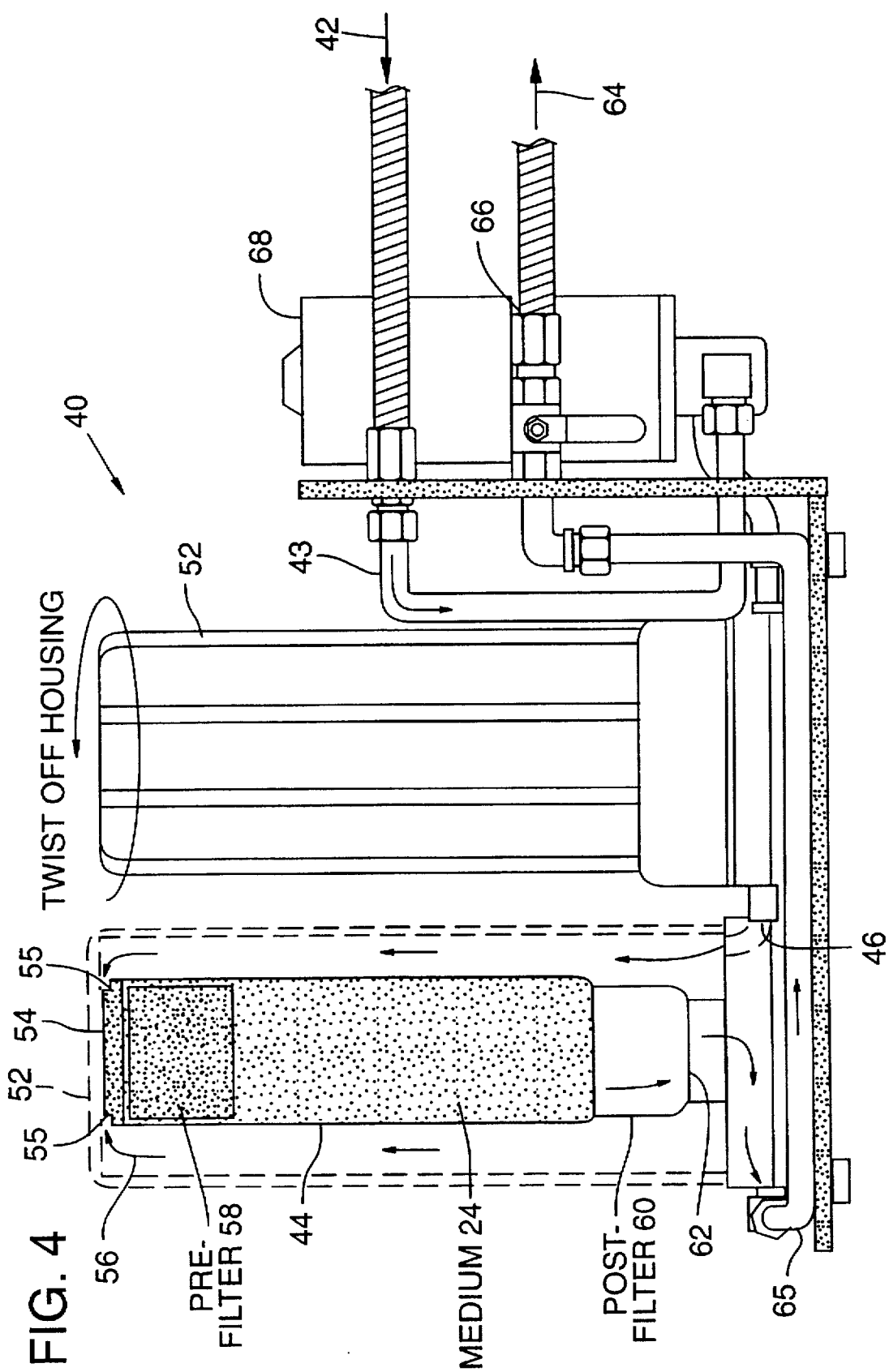

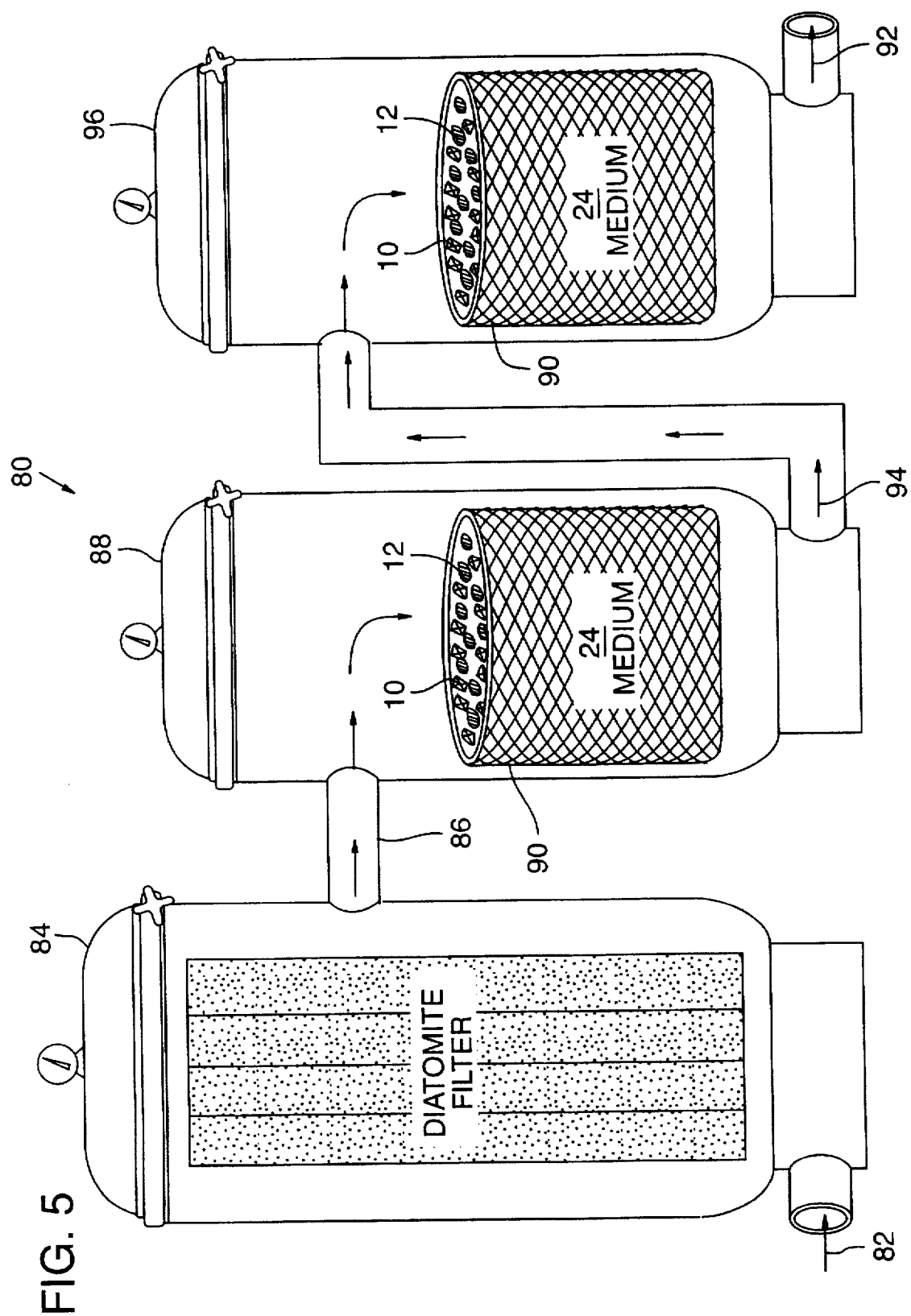

BONDED POLYMER FILTER MEDIUM AND ITS USE

BACKGROUND OF THE INVENTION

This invention relates to a coated or bonded multi-component medium for the concurrent adsorption and absorption of organic compounds, and to the use of such medium in the treatment of waste streams containing organic compounds, and more particularly for use of a bonded multi-component medium in the treatment of water which contains petroleum hydrocarbons. Further, and more specifically, the invention relates to the use of such a medium in removing hydrocarbons from water drawn from an oil spill on open water.

Activated carbon is largely effective, and is widely used, for the removal of soluble organic compounds from industrial wastewaters. Generally, granular carbon is provided in cartridges or filter beds, and the water to be treated is passed downward through the carbon bed. Removal of the organic compounds from a given wastewater stream occurs principally by physical adsorption of the contaminants onto surface active sites of the carbon. This phenomenon involves taking advantage of the naturally occurring electrostatic or attractive forces between the carbon and the organic molecules. By and large, the percentage of available surface adsorption sites does not far exceed about twenty five percent (25%) of the volume of the carbon when treating wastewater streams. This limiting phenomenon is believed to be caused by an affinity between water molecules and the carbon; an attraction is present which is sufficiently strong that water molecules initially occupying many adsorption sites interior to carbon particles are never displaced by the organics whose capture is sought. As a consequence, use of carbon beds, while not normally excessively expensive, is nevertheless not of great efficiency.

Further, with respect to water treatment, activated carbon beds are generally of little or no use with respect to the non-solubilized organics, especially those which occur in colloidal form, suspensions, or emulsions. When such non-solutes are found in a given waste stream, the carbon beds tend to quickly fail due to rapidly decreasing hydraulic capacity. Particularly when dealing with substantial volumes of non-solute petroleum hydrocarbons, which contain appreciable portions of semi-volatile or non-volatile components, such carbon beds will tend to clog, thereby reducing hydraulic capacity, and ultimately plug, in those conventional carbon adsorption medium of which I am aware.

Another technology which has long been known but has recently been further developed and more widely employed for treatment of free oil and grease, especially for capture of hydrocarbons floating on the surface of water bodies, is sorption, or more precisely, absorption. With regard to free hydrocarbons, such as may result from many types of industrial situations, such as fuel spills, oil spills, or which may be present in bilge water from ships or motorcar parking lot runoff, for example, it would be desirable to absorb such contaminants into reactive polymers to bind the volatile and semi-volatile components, and thereby to create a solid which is relatively safe to handle, and which does not appreciably release the absorbed substances. While some such binding agents have been tried, and a few are relatively successful at agglomerating and capturing free oils, such products have generally not been completely successful with regard to treatment of wastewater streams to remove petroleum hydrocarbons. That is because when the heretofore known media including such polymers encounter hydrocarbons, the polymers react and swell up, increasing dramatically in volume, which in fairly short order effectively plugs the hydraulic path of a wastewater stream through a treatment vessel containing such polymers. Even for those relatively few known absorptive polymers which do not extensively swell, the polymer particles have tended to agglomerate and compact upon the capture of hydrocarbons, with a general molding together, ultimately forming a hydraulically plugged polymer mass.

Thus, it can be appreciated that it would be desirable to provide a medium for treatment of waste streams which (a) avoids the disadvantages of activated carbon with respect to plugging upon encountering appreciable free organics, particularly petroleum hydrocarbons, and (b) utilizes polymers to bond petroleum hydrocarbons, while avoiding the phenomenon of pluggage of the filter medium by agglomeration of polymer particles. Moreover, it would be extremely desirable to provide a filter medium which (a) utilizes the advantages of activated carbon adsorption to remove trace soluble organics from solutes from water or air solutions, (b) utilizes the advantages of absorptive polymers to capture suspended, emulsified, and free oil entering a filtering apparatus, and © performs efficiently through a wide range of volatilities of organics.

SUMMARY OF THE INVENTION

I have developed a novel, coated, and to some extent bonded multi-component medium for the removal of organic compounds from a stream containing such compounds. The medium preferably contains at least two active components, namely activated carbon adsorbent and an organic polymer absorbent blend. The medium is prepared by adding a selected quantity of carbon of a preselected size to a mixer, then wetting the activated carbon with a water-based aliphatic resin binder adhesive thus eliminating the static charge on the carbon, and then adding hydrophobic absorption bonding polymers to the mixer, then thoroughly mixing the hydrophobic absorption bonding polymers with the carbon in stated proportions, until both the carbon particles and the polymer particles are effectively coated with the binder adhesive, acting as a bonding agent.

After thoroughly mixing, the medium mixture is preferably poured into containers, and then air-dried at room temperature and low humidity, to cure the aliphatic resin adhesive binder.

Upon curing, the medium mixture forms a loose but cohesive and relatively low density sponge-like mass. The medium is porous, in that the cured resin bonds carbon and polymer alike in a semi-rigid but flexible position, relative to adjacent particles of carbon and polymer, and in that it appears that the cured resin is somewhat crystalline in nature and thus forms hydraulic passageways through which the fluid to be treated must flow, thereby keeping up the hydraulic gradient for flow into the carbon and thus increasing its effectiveness in contaminant removal efficiency. Since the cured resin binder is not water soluble, it is unaffected by passage of water therethrough. As a result, an exemplary bonded multi-component medium is provided, which medium provides properties superior to either polymers or activated carbon alone. More importantly, this unique bonded multi-component medium allows use of both polymers and activated carbon in a common filter vessel, thus simplifying design, operation, and maintenance of filtration equipment.

With two, and more preferably, three different polymers included in the organic polymer absorbent blend, the range of effectiveness of the medium is enhanced to a wide range of volatilities or densities of organics. In addition, the use of such plural copolymers, having different reaction ranges on the carbon scale, enables adjustment of the medium to address density/volatility ranges of organics as desired. This facilitates versatility of the medium in oil spill cleanups, for example.

The unique multi-component bonded medium may be placed into a water treatment apparatus to treat a stream of water for removing undesirable organic substances therefrom. Typically, the treatment apparatus is a filtering apparatus of the type including a vessel for confining the mixture, inlet means for introducing water to be treated into the vessel, and an outlet means spaced from the inlet means for discharging the treated water. The multi-component bonded filter medium preferably includes (a) carbon particles, wherein the carbon is activated for the absorption of at least a portion of the undesirable substances from the water stream, (b) at least two polymer binding agents, where the polymers are of the hydrophobic type and adapted to coagulate and bind at least a portion of the undesirable organic substances from the water stream; and © a bonding agent, preferably of the aliphatic resin binder type, where the bonding agent coats at least a portion of the carbon particles, and coats at least a portion of the polymer particles, and upon curing of the binder agent, thereby affixes in a semi-solid sponge-like mass the polymer and carbon, so as to provide a relatively fixed bed multi-component medium wherein the polymer is bonded to the carbon. In a preferred form of the medium and method of its production, a surfactant is used along with the aliphatic resin to further reduce static charge on the carbon particles and to assure even distribution of the aliphatic resin throughout the medium bed.

My unique filter medium provides a novel solution to the problem of oil or volatile organic carbon removal from a water stream. The bonded filter medium removes waterborne contaminants by providing sites for both adsorbing and for chemically bonding organics. In normal operation, water to be treated passes through the medium, and the organics may be adsorbed and absorbed on the respective components of the medium, while not appreciably disturbing the structure of the bed, nor encountering great swelling or volume increase upon pickup of organics, even up to the breakthrough limits of the medium. About five percent swelling may occur.

The medium of the invention, in a different form which does not include the carbon component, is also useful in cleaning up open water spills such as oil spills. Both specific gravity of the medium and its effective reaction range on the carbon scale can be adjusted to specific applications. Specific gravity is adjusted so that the medium is heavier than the oil spill and just slightly lighter than water, so that the medium settles through the oil to the water interface. The medium then reacts at the interface, bonding upwardly (other products have reacted from the top of the oil spill, tending to leave a sheen on the water surface. Effective reaction range, which can be as broad as $C_3$–$C_{20}$ or to $C_{21}$ in some instances, is adjusted by adjusting the amount of each of the plurality of copolymers included in the medium. Each of the preferably three copolymers has a different reaction range in the carbon scale.

My unique filter medium may also be used in vapor phase contaminant removal, to adsorb and absorb contaminants from a vapor stream. Typical of applicable service for this media would be the removal of contaminants such as "BTEX" components (that is, benzene, toluene, ethyl benzene and xylene components) from an air stripping column exhaust stack at a site where groundwater has been contaminated by a petroleum fuels storage operation.

By providing the bonded multi-component filter medium as described herein, water treatment apparatus necessary for purification of wastewater streams is less expensive to manufacture, install and maintain. More importantly, with my medium, treatment can in many cases be achieved in a single vessel or single unit operation, i.e. one filtration train, rather than a series of operations (such as physical separation followed by filtration), thus simplifying plant design and maintenance. Further, cleanup of open-water spills is more efficient, cost-effective and thorough.

At breakthrough of the filter medium of the invention, the medium cartridge or container preferably is taken off-line, then allowed to cure for a time (e.g., 24 hours) sufficient to allow thorough stripping of the carbon which yields a non-leading disposable waste, in a form that will pass TCLP's. At breakthrough the medium will typically be at 80% saturation, allowing full curing. The curing insures that no hydrocarbon waste remains lodged in the sites available for adsorption in the carbon and will be stripped and bonded into the polymer, which will not leach. The waste product thus can be used in landfills.

As a further beneficial result, the waste product containing hydrocarbons can be burned, typically having a BTU rating of at least 19,000 BTU/pound as a clean burning alternative fuel.

Thus, the present invention has as its primary objective the provision of a bonded multi-component treatment medium which can both adsorb and absorb organic compounds, while maintaining hydraulic flow through the medium until the medium is substantially exhausted. Another objective is to provide such a medium which has adjustable parameters and which is efficiently used in open water spill cleanups.

It is therefore a primary object of this invention to provide an improved medium, and a process for its use in extracting liquid organic solutes such as petroleum fuel fractions, straight run petroleums, light hydrocarbons, aromatics, organo-solvents, oxygenated hydrocarbons, and the like from admixtures and solutions with water.

It is also a primary object of this invention to provide an improved medium, and a process for its use in extracting volatile organics, semi-volatile organics and the above-listed substances from admixtures and solutions with air.

It is another object of this invention to provide a process of the character described which maintains a good hydraulic or aerodynamic flow, as the case may be, through the filter medium until exhaustion of the medium.

Yet a further object of this invention is to provide a multi-component filter medium which makes it possible to take advantage of the unique physical and chemical properties of its components, including adsorption and absorption coefficients, to provide a medium which is superior to such components used individually or in previously known combinations.

A still further object of this invention is to provide a medium which, upon exhaustion by its use, may be disposed of in a non-polluting, non-toxic, and relatively inexpensive manner as landfill or as a low-volatility non-leaching alternative fuel which will burn at least at 19,000 BTU per pound.

Other objects of the invention will be apparent hereinafter. The invention accordingly comprises a superior multi-component medium, a process for its manufacture, and several processes for its use, and the several steps in the various processes, and the relation of one or more of such steps with respect to each of the others, and the apparatus which is adapted to effect such steps, all as exemplified in the following detailed disclosure, and the scope of which will be indicated in the accompanying claims.

DESCRIPTION OF THE DRAWINGS

FIG. 4 illustrates a simple filtration unit employing the filter medium of the invention.

FIG. 5 illustrates the use of multi-stage filter vessels having media therein according to the present invention, as may be utilized in a commercial or industrial application.

DESCRIPTION OF PREFERRED EMBODIMENTS

The novel medium of the present invention may be considered to be a semi-rigid yet flexible matrix which includes activated carbon particles and hydrophobic polymer particles coated with an aliphatic resin binder, the result being that the various particles are affixed in a cohesive sponge-like low density filter mass.

Figure 1:
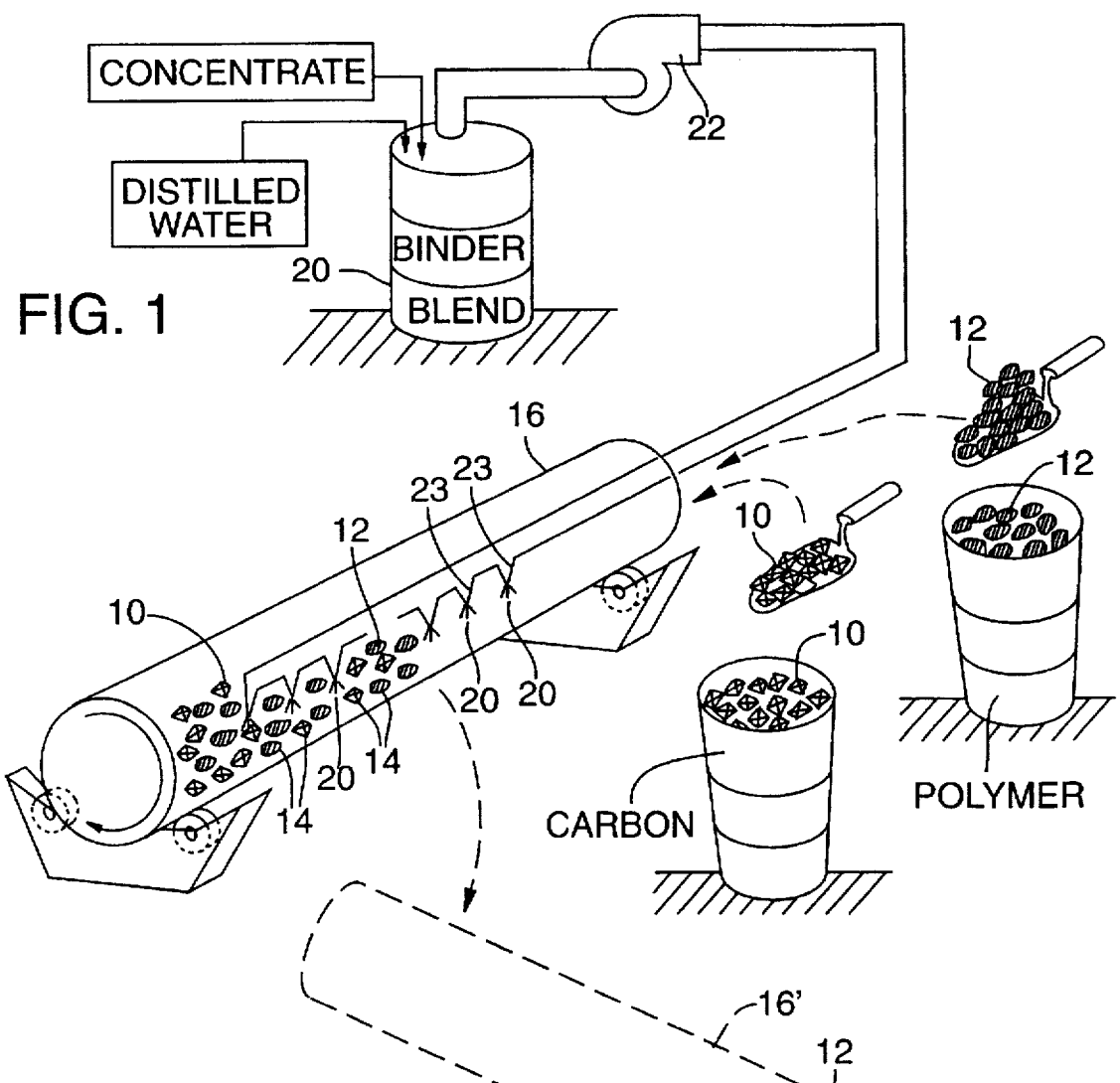
FIG. 1 illustrates the apparatus and method employed in the manufacture of the bonded multi-component filter medium.

Attention is directed to FIG. 1, wherein a method and apparatus suitable for preparation of the instant filter medium is described. Two active components, namely activated carbon adsorbent particles 10 and a polymer blend of at least two organic polymer absorbent particles 12 are supplied. A medium mixture 14 is prepared by adding a selected quantity of carbon particles 10 of a preselected size to a mixer 16 then wetting the activated carbon particles 10 with a water-based aliphatic resin binder adhesive 20, thus eliminating the static charge on the carbon particles 10. A surfactant may also be added along with the aliphatic resin binder adhesive, to aid in static charge elimination and assure even distribution of the binder adhesive. Then, the blend of hydrophobic absorption binding polymer particles 12 are added to the mixer 16, and the carbon particles 10 are thoroughly mixed with the hydrophobic absorption binding polymer particles 12, until both the carbon particles 10 and the polymer particles 12 are effectively coated with the binder adhesive 20, which acts as a bonding agent and is thus referred to herein. After thorough mixing, the medium mixture 14 is preferably poured into filter cartridge forms 22 of a suitable preselected shape and size by turning the mixer 16 into the position indicated at 16'. Then the medium mixture 14 is air dried, preferably at room temperature and low humidity, to cure the aliphatic resin binder 20. Upon curing, the medium mixture 14 forms a loose but cohesive and relatively low density sponge-like medium mass 24.

The activated charcoal particles 10 may be selected from charcoal produced from a variety of suitable materials, such as bituminous or lignite coal, peat, wood, or coconut base. However, it is desirable to provide a source which minimizes crushing and breakage of the carbon particles 10. Nevertheless, one advantage of the present medium 24 is that it cushions and protects carbon 10, thus sharply minimizing the carbon loss which normally occurs in other prior art systems of which I am aware. I have found that it is advantageous to provide carbon 10 in the 16 to 32 mesh size range, to approximate the size of polymers 12 being provided.

The aliphatic resin binder adhesive or bonding agent 20 may be supplied from any convenient commercially available formula. However, we have found that a formulation made by the Bordon Company of Kent, Washington, U.S.A. and known as Type T-16-E will provide satisfactory results. I normally mix the binder 20 concentrate, as procured, by making a ten percent (10%) solution by volume, by diluting the binder 20 concentrate with distilled water. While desirable amounts may vary somewhat, to provide different degrees of bonding and with respect to the exact formulation provided, I have found about 1 fluid ounce of binder 20, as prepared for spraying, per pound of carbon 10, to be a workable amount to result in a medium matrix 24 with the desired properties, and sufficient to overcome the static charge problems further described herein below. I have found it desirable to supply binder 20 via way of a pump 22 from a convenient supply, and to use spray nozzles 23 to spray binder 20 onto the carbon 10, before adding polymer 12, or to the medium mixture 14 to supplement the amount of binder 20 as necessary. As noted above, use of a surfactant along with the aliphatic resin helps achieve even distribution of the aliphatic resin and is preferred. The amount of surfactant used is approximately equal to the volume of the aliphatic resin concentrate.

The petroleum binding polymers 12 are preferably obtained in the dry granular form. A variety of hydrophobic polymers are available for absorbing petroleum-based products, and they vary somewhat in polymer type, molecular weight, cross linkages, density and particle size distributions. In the preferred embodiment, petroleum binding agent polymers 12 which are well-suited for use in the instant invention have been found to be three-block copolymers with polystyrene end blocks and elastomer midblocks. The first polymer is a linear styrene-butadiene-styrene (S-B-S) co-polymer with a 70/30 butadiene/styrene ratio. The second is styrene-ethylene/butylene-styrene (S-EB-S) co-polymer. A radially-linked copolymer preferably is also used in the copolymer blend, e.g., $S_1-B_1-S_2-B_2-S_3-B_3-S_4-B_4$. Specific gravity of these polymers averages about 0.91, 0.92, with 0.91 the lightest and 0.93 the heaviest and most complex. For bonding of the polymers 12 in a filter medium matrix 24 with activated carbon 10, the polymers 12 are preferably provided at approximately the same particle size range as the carbon 10. I have found the nominal size range in the +16 to −32 mesh size to provide optimal performance. One pound of the polymers will pick up about 15 pounds of liquid petroleum product, with minimal volumetric increase when picking up, absorbing, and retaining such petroleum-based liquids. Also, an important feature of the polymers is that while removing hydrocarbons, they do not retain water. Overall, the polymers allow a total medium bed 24 expansion, from initial feed through bed 24 exhaustion, in the five percent (5%) range.

The relative proportions of the charcoal 10 and polymers 12 have been found through testing to achieve the desired results with approximately equal weights of carbon 10 and polymers 12. Since the carbon 10 and polymers 12 are of approximately the same specific gravity (the polymer 12 being only nominally lighter than the usual carbon 10) they are also of approximately the same volumes. This proportion may be varied somewhat, since one of the objectives of the present invention is to fully consume both the polymers 12 and the carbon 10 by the time of breakthrough of the contaminants through a filter medium matrix 24, and it can be appreciated that the mix of contaminants will inevitably vary somewhat in different applications One significant problem which I had to overcome is that the static charge on the polymers 12 and the static charge on the carbon 10 resulted, when both are dry, in the carbon 10 and the polymers 12 constantly trying to separate. Therefore, the immediate problem was neutralization of the negative static charge on the polymers, so as to create a homogeneous bond. By spraying the aliphatic binder resin 20 on the carbon 10, I essentially neutralized the static charge of the carbon 10, and thus made addition and binding of the polymers 12 easy to accomplish. I also found that such neutralization is better assured by including a surfactant with the aliphatic resin.

Figure 2:
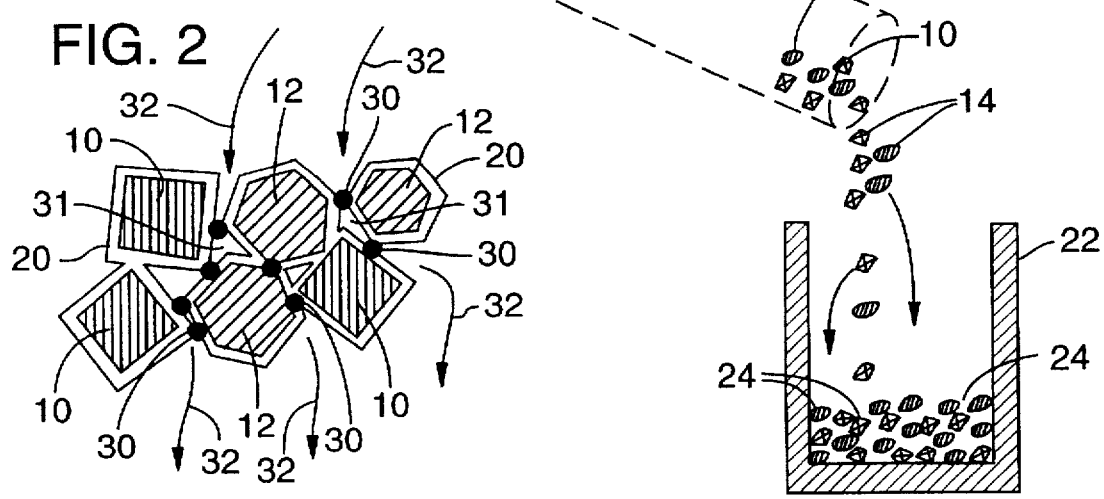
FIG. 2 illustrates the basic structure of the multi-component filter medium matrix.

Turning now to FIG. 2, it can be appreciated that the cured medium matrix 24 is porous, in that the cured resin 20 bonds carbon 10 and polymers 12 alike in a semi-rigid but flexible position, relative to adjacent particles of carbon 10 and polymers 12. It is believed that the cured resin adhesive binder or bonding agent 20 is somewhat crystalline in nature and thus forms attachment nodes 30 (binder joints) with adjacent hydraulic passageways 31 (where the binder ends) through which the fluid (indicated by reference arrows 32) to be treated must flow, thereby keeping up the hydraulic gradient for flow of fluid 32 into the carbon 10 and thus increasing its effectiveness, i.e., improving contaminant removal efficiency. Since the cured resin binder (bonding agent) 20 is not water soluble, it is unaffected by passage of water therethrough. As a result, an exemplary bonded multi-component medium 24 is provided, which medium 24 provides properties superior to either the polymers 12 or activated carbon 10 alone. More importantly, this unique bonded multi-component medium 24 allows use of both polymers 12 and activated carbon 10 in a common filter vessel, thus simplifying design, operation, and maintenance of filtration equipment.

The resulting medium mixture 24 has interstitial spaces 31 within the packing structure. Also, the carbon 10 has many microscopic adsorb sites (not shown) which represent thousands of minute hydraulic paths through the carbon. The net effect is that the effectiveness of the carbon 10 is actually enhanced as an adsorb medium because of the continual voiding of those sites by the hydraulic pressure therethrough. Normally, carbon in aqueous solutions is only about 25% effective, because 75% of sites that would normally adsorb volatiles are blocked with water. Capillary action inherent in the structure of a carbon particle 10 normally keeps them blocked, so only surface sites are able to perform adsorption. In prior art carbon adsorption units, the sites internal to the carbon particle adsorb substantially no contaminants. In contrast, in the present invention, because of the hydraulic mechanism inherent in these bonded matrix medium 24, when the polymers 12 start to gel, hydraulic pressure on the carbon 10 is increased. Although the volatile contaminants are sufficiently bonded by adsorb action to maintain contaminant attraction, it is believed that water is forced through the carbon bed to increase exposure of active adsorption sites to the contaminants in the wastewater feed.

Figure 3:
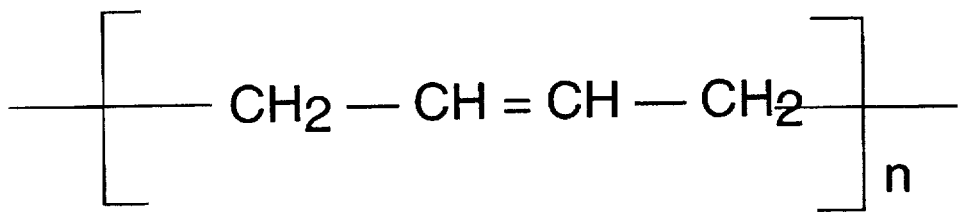
FIG. 3 illustrates the chemical structure of the S-B-S and S-EB-S polymers used to manufacture the multi-component filter medium.
Figure 3:
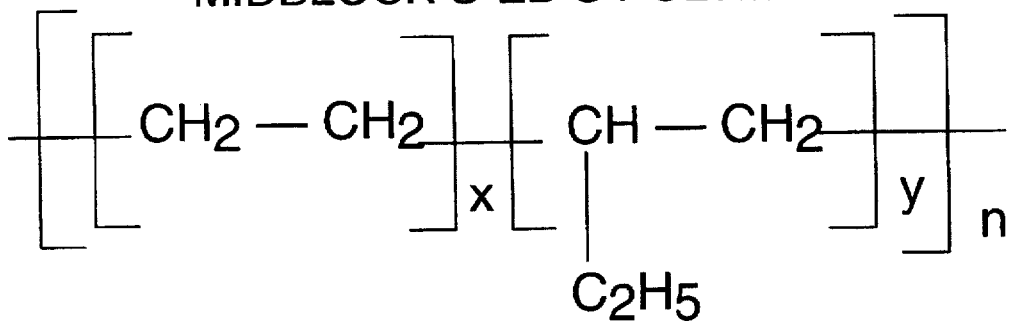
Figure 3:
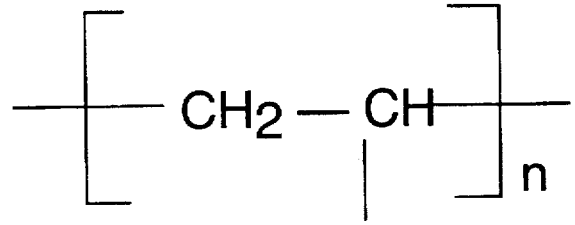
Figure 3:
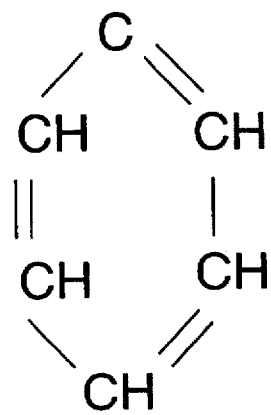

FIG. 3 illustrates the chemical block structure of the polymers 12. It is readily appreciated that the linear structure of the styrene-butadiene-styrene (S-B-S) co-polymer creates a material of lower molecular weight which will respond very rapidly on exposure to petroleum hydrocarbons. The tri-block styrene-ethylene/butylene-styrene (S-EB-S) co-polymer evidences a more complex molecular structure which responds to a broader range of petroleum hydrocarbon contaminants, as does the radially bonded copolymer $S_1-B_1-S_2-B_2-S_3-B_3-S_4-B_4$, which is similar in nature and construction to the endblock of the polystyrene copolymer reflected in FIG. 3.

Generally the absorbent efficiency of these polymers is predicated on the volatility of the contaminant and the hydrocarbon chain structure (optimum range: $C_6$ to $C_{16}$) and the solubility parameter of hydrocarbons to be absorbed. The polymers will usually bond with hydrocarbons having solubility parameters close to that of the polymer itself. The polymers 12 used in the medium matrix 24 provide different molecular weights offering the broadest range of reactivity. The range of effectiveness of the medium can be adjusted by adjusting the quantity of each co-polymer, and the range can be expanded to cover $C_3$, to $C_{20}$ or even to $C_{21}$. The radially bonded copolymer is effective for the more complex, heavier end of the carbon range.

FIG. 4 illustrates in a cutaway view that the unique multi-component bonded medium 24 may be placed into a water treatment apparatus 40 to treat an incoming stream of water 42 for removing undesirable organic substances 43 therefrom. FIG. 4 shows two filters in series in a multistage arrangement. Typically, the treatment apparatus 40 is a filtering apparatus of the type including a vessel 44 for confining the medium matrix 24, inlet means 46 for introducing water 42 to be treated into the vessel 44, and an outlet means 62 spaced from the inlet means 46 for discharging the treated water. While simpler configurations will be illustrated later, the apparatus 40 includes an outer housing 52 (dashed lines), and a top polyurethane ring 54 with passageways 55 therethrough for the admission of the water to be treated, as indicated by arrow 56, to a prefilter 58, thence to the medium 24 of the present invention, and thence to a post filter 60, and subsequently to an outlet 62. Clean water 64 then exits through a pipe 65 to an outlet 66. The apparatus 40 is typical of the arrangement which may be used for testing the medium 24 for service, or which may be used at a residential or small commercial application. Those familiar with such devices generally will recognize that a pump 68 may or may not be required, depending upon the service, and that a variety of process systems may be designed using medium 24.

There are many uses for the medium 24 in the process of cleaning contaminated waters. For example, groundwater contaminated from petroleum tank leakage, oily wastes from fuel tank cleaning, fuel contaminated wastewaters, oily waste from tank bottoms, bilge water or wastewater resulting from bilge pumping and cleaning operations, urban parking lot runoff, including storm drain oily wastewaters, truck and rail car cleaning wastes, are but a few among a myriad of wastewater applications which may be addressed by the medium described herein. Many of these water treatment applications may greatly benefit by use of the multi-component medium 24 described herein. For example, in truck fleet washing, the wastewaters generated are generally high in silts and oily emulsions. Therefore, the use of an oil specific polymer 12 and carbon 10 adsorption to polish to treatment result is highly desirable.

As discussed above, the medium of the invention, in granular form and in the absence of carbon, can be effectively used in open water spills such as oil spills. Specific gravity of the carbonless medium for this purpose is adjusted by introduction of talc and silica, to be heavier than the spill but lighter than water.

Attention is now directed to FIG. 5, where a wastewater treatment apparatus 80 is illustrated. Incoming contaminated water 82 is fed to a prefilter 84, which may be of diatomite or other suitable filter medium. This prefilter 84 basically reduces and, to the extent possible, eliminates the particulates in the incoming stream 82. The pretreated water 86 enters a first multi-component medium filter 24 housing 88, and travels downward into a preformed filter cartridge pack 90, manufactured as hereinabove described. To achieve a desired final effluent 92 quality, more than one stage of filtration by multi-component medium 24 may be provided. Two stages are shown provided here, and the interstage effluent 94 is routed to a second multi-component medium 24 filter housing 96. Preliminary test has indicated that each stage in a multistage filtration process using medium 24 yields about ninety percent (90%) reduction in the contaminants entering that stage, at least where two to three stages are involved.

The superior results of the multi-component medium as described herein have been characterized both by (1) organic breakthrough tests, and (2) wastewater contaminant removal tests.

Therefore, it is to be appreciated that the medium provided by the present invention is an outstanding improvement in the state of the art of filtration and removal of petroleum components from wastewaters. The process of manufacture of the medium is relatively simple, and the resulting medium substantially eliminates carbon loss from carbon adsorption systems; that has been a significant drawback to the heretofore known systems. Also, the bonded medium cushions the carbon in transit, tending to reduce breakage and still further reducing carbon loss.

It is thus clear from the heretofore described figures that the present medium invention, and the process of using the medium, are a dramatic improvement in the state of the art in filtration. It will be readily apparent that the present invention may be easily adapted to other embodiments incorporating the concepts taught herein and that the present figures are shown by way of example only and not in any way a limitation. Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalences of the claims are therefore intended to be embraced therein.

I claim:

1. A multi-component medium for treating an aqueous stream for the removal of hydrocarbon based components therein, said medium comprising:

(a) carbon particles activated for the absorption of at least a portion of the substances from the stream;

(b) at least two different polymer binding agents each adapted to coagulate and bind at least a portion of the hydrocarbon based components from the stream, the polymer binding agents each having a different reaction range in the carbon scale; and (c) a bonding agent coating at least a portion of the carbon and affixing thereto the polymer binding agents, so as to provide a multi-component medium wherein the polymers are bonded to the carbon.

2. The medium of claim 1, further including a surfactant.

3. The medium of claim 1, wherein the size of the carbon particles are in the range of 16 to 32 mesh size.

4. The medium of claim 1, wherein the polymer binding agents include a styrene-butadiene-styrene block co-polymer and a styrene-ethylene/butylene-styrene block co-polymer.

5. The medium of claim 4, including a radially linked styrene-butadiene-styrene block copolymer.

6. The medium of claim 1, wherein said bonding agent comprises a latex acrylic binder adhesive.

7. The medium of claim 1, wherein said bonding agent comprises an aliphatic resin adhesive.

8. The medium of claim 1, in combination with a filter apparatus including a vessel for containing and confining the medium, an inlet for introducing the aqueous stream into the vessel, and an outlet spaced from the inlet for discharging a treated aqueous stream.

\* \* \* \* \*